United States Patent
Yang et al.

(10) Patent No.: US 9,429,492 B2
(45) Date of Patent: Aug. 30, 2016

(54) OFFSET CORRECTION METHOD FOR AUTOMOBILE OIL PRESSURE SENSOR

(71) Applicant: Hyundai Motor Company, Seoul (KR)

(72) Inventors: Dong Ho Yang, Geoje-si (KR); Joon Young Park, Seoul (KR); Sang Joon Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 118 days.

(21) Appl. No.: 14/332,981

(22) Filed: Jul. 16, 2014

(65) Prior Publication Data

US 2015/0149030 A1 May 28, 2015

(30) Foreign Application Priority Data

Nov. 26, 2013 (KR) .................. 10-2013-0144446

(51) Int. Cl.
| | |
|---|---|
| *G01L 27/00* | (2006.01) |
| *G01M 15/09* | (2006.01) |
| *F01M 11/00* | (2006.01) |
| *F02D 41/24* | (2006.01) |
| *F02D 41/06* | (2006.01) |

(52) U.S. Cl.
CPC ............ *G01L 27/002* (2013.01); *F01M 11/00* (2013.01); *F02D 41/2474* (2013.01); *G01M 15/09* (2013.01); *F02D 41/061* (2013.01); *F02D 2200/024* (2013.01)

(58) Field of Classification Search
CPC ................. F16H 57/0449; F16H 2059/683; F16H 2061/1284; G01L 27/002; F02D 41/2474
See application file for complete search history.

(56) References Cited

U.S. PATENT DOCUMENTS

| | | | | |
|---|---|---|---|---|
| 4,862,393 A | * | 8/1989 | Reid ................. | F01M 11/10 123/196 S |
| 6,484,127 B1 | * | 11/2002 | Langervik ............ | F01M 11/10 340/451 |
| 8,285,463 B2 | * | 10/2012 | Moses ................ | F16H 59/68 477/156 |
| 8,370,017 B2 | * | 2/2013 | Weber ................ | F02D 41/064 123/295 |
| 8,909,410 B2 | * | 12/2014 | Weber ................ | F02D 41/064 123/295 |
| 9,341,131 B2 | * | 5/2016 | Weber ................ | F02D 41/064 |
| 2006/0213276 A1 | * | 9/2006 | Ueyanagi ............ | G01L 19/0084 73/754 |
| 2009/0299583 A1 | * | 12/2009 | Dell' Eva ............ | F16H 59/68 701/51 |

(Continued)

FOREIGN PATENT DOCUMENTS

| | | |
|---|---|---|
| JP | 3773800 B2 | 5/2006 |
| JP | 2012-236464 A | 12/2012 |

(Continued)

OTHER PUBLICATIONS

Korean Office Action mailed Nov. 19, 2014, issued in counterpart Korean Patent Application No. 10-2013-0144446; 4 pages (in Korean language).

*Primary Examiner* — Thomas G Black
*Assistant Examiner* — Peter D Nolan
(74) *Attorney, Agent, or Firm* — McDermott Will & Emery LLP

(57) ABSTRACT

An offset correction method for an automobile oil pressure sensor determines whether or not an engine start signal is applied. An offset value of the oil pressure sensor installed on an oil pressure line connected to an oil pump is detected within a first preset period after the start signal is applied. An output value of the oil pressure sensor is corrected after the offset value is detected.

6 Claims, 2 Drawing Sheets

(56) References Cited

U.S. PATENT DOCUMENTS

| | | | | |
|---|---|---|---|---|
| 2011/0010035 A1* | 1/2011 | Weber | ............... | F02D 41/064 701/31.4 |
| 2011/0040463 A1* | 2/2011 | Moses | ............... | F16H 59/68 701/63 |
| 2013/0131958 A1* | 5/2013 | Weber | ............... | F02D 41/064 701/102 |
| 2015/0094932 A1* | 4/2015 | Weber | ............... | F02D 41/064 701/102 |

FOREIGN PATENT DOCUMENTS

| KR | 10-2005-0040971 A | 5/2005 |
|---|---|---|
| KR | 10-2012-0131609 A | 12/2012 |
| KR | 10-2013-0000813 A | 1/2013 |

* cited by examiner

OFFSET CORRECTION METHOD FOR AUTOMOBILE OIL PRESSURE SENSOR

CROSS REFERENCE TO RELATED APPLICATION

The present application claims the benefit of priority to Korean Patent Application Number 10-2013-0144446 filed in the Korean Intellectual Property Office on Nov. 26, 2013, the entire contents of which is incorporated herein for all purposes by this reference.

TECHNICAL FIELD

The present disclosure relates, in general, to an oil pressure sensor, and more particularly, to an offset correction method for an automobile oil pressure sensor, which reduces an error occurring when an offset of an oil pressure sensor that senses oil pressure of an engine clutch used for hybrid vehicles is corrected.

BACKGROUND

A hybrid vehicle uses a driving power of an engine and a motor, either in combination or alone. Such a hybrid vehicle can travel using only the driving power of the motor at normal times or driving power of the engine together with the motor. When the power of an internal high-voltage battery is insufficient, or when sufficient driving power cannot be obtained only by the motor, the engine supplies the driving power.

When the driving power of the engine is not required at normal times, connection between the engine and the motor or between the engine and a gearbox is released, so that a loss of power caused by the engine, which is not driven, must be reduced. For this, a clutch operated using oil pressure is provided between the engine and the motor or between the engine and the gearbox, and controls a transmission of driving power of the engine.

The clutch is operated by a hydraulic cylinder separately installed to connect or disconnect the clutch, and the connection of the clutch is made according to the operation of the hydraulic cylinder. The oil pressure applied to the hydraulic cylinder must be suitably controlled according to a preset control level. For this, a separate oil pressure sensor is provided on the hydraulic cylinder connected to an oil pump or on an oil pressure line in which oil is applied to the hydraulic cylinder, and is configured to detect the oil pressure applied to the hydraulic cylinder and apply a pressure suitable for a current condition via a feedback operation.

Further, in an oil pressure sensor, an offset generally occurs for an initial value thereof depending on a production process and design of the oil pressure sensor. For example, in the case where the oil pressure sensor is designed to output the initial value thereof as 0 V, if the oil is not pressurized in an oil pressure line, the initial value must be 0 V, but, due to the above-described factors, an offset such as 0.1 V or 0.3 V occurs in the initial value.

Therefore, there is a need to correct the offset and obtain the output value of the oil pressure actually generated. Conventional technology is configured such that a correction starts at the same time that the oil pump is driven, upon correcting the offset.

However, when the oil pump is driven, oil pressure caused by an oil leakage in the oil pressure line, which occurs in a solenoid valve or the like, is recognized as the offset by the oil pressure sensor. Therefore, the correction caused by the pressure of leaked oil is also performed together with the correction of the offset, thus causing a problem in that oil pressure higher than a suitable value is actually applied to the oil pressure line or the hydraulic cylinder.

The foregoing is intended merely to aid in the better understanding of the background of the present disclosure, and is not intended to mean that the present disclosure falls within the purview of the related art that is already known to those skilled in the art.

SUMMARY

An aspect of the present disclosure provides an offset correction method for an automobile oil pressure sensor, which causes a time at which the offset of the oil pressure sensor is detected to precede a time at which an oil pump is driven, so that oil leakage caused by driving the oil pump does not influence the detection of the offset by the oil pressure sensor, thus improving the accuracy of the oil pressure sensor.

According to an exemplary embodiment of the present disclosure, an offset correction method for an automobile oil pressure sensor includes determining whether or not an engine start signal is applied. An offset value of an oil pressure sensor installed on an oil pressure line connected to an oil pump is detected within a first preset period after the start signal is applied. An output value of the oil pressure sensor is corrected after the offset value is detected.

The oil pump may be driven after the offset value is detected.

The first preset period may be a period spanning from a time at which the start signal is applied to a time at which the oil pump is driven.

The offset value may be detected after a second preset period has elapsed from the application of the start signal.

A validity determination is performed after detecting by determining whether or not the start signal is applied after a third preset period has elapsed from turning-off of ignition of the vehicle.

If a third preset period has elapsed, performing the validity determination may generate a correction value for the offset value and store the generated correction value.

The correction value may be generated and stored before driving.

In accordance with the offset correction method for the automobile oil pressure sensor having the above configuration, only the offset of the oil pressure sensor itself can be detected, thus improving the accuracy of the oil pressure sensor and the accuracy of other control logics that use the oil pressure sensor Further, an engine clutch can be accurately controlled.

BRIEF DESCRIPTION OF THE DRAWINGS

The above and other objects, features, and advantages of the present disclosure will be more clearly understood from the following detailed description taken in conjunction with the accompanying drawings.

DETAILED DESCRIPTION

Hereinafter, an offset correction method for an automobile oil pressure sensor according to embodiments of the present disclosure will be described in detail with reference to the attached drawings.

Figure 1:
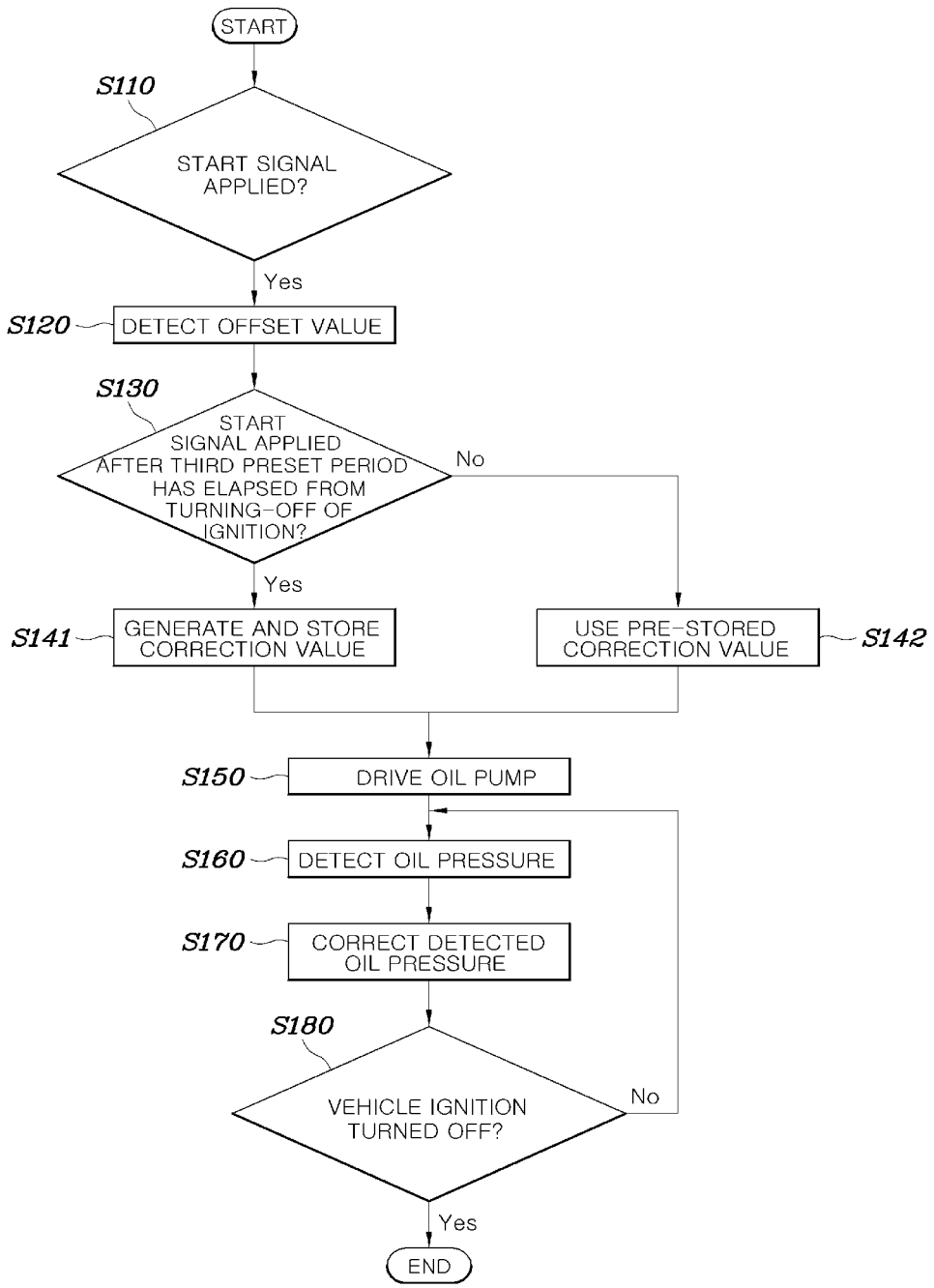
FIG. 1 is a flowchart showing an offset correction method for an automobile oil pressure sensor according to an embodiment of the present disclosure.

FIG. 1 is a flowchart showing an offset correction method for an automobile oil pressure sensor according to an embodiment of the present disclosure. The offset correction method includes starting determination step S110 of determining whether or not an engine start signal is applied. Detection step S120 detects an offset value of an oil pressure sensor installed on an oil pressure line connected to an oil pump within a first preset period after the start signal is applied. Correction step S170 corrects the output value of the oil pressure sensor after detecting the offset value at step S120, and driving step S150 drives the oil pump after detecting the offset at step S120.

In detail, the first preset period denotes a period ranging from the application of the start signal to a time at which the oil pump is driven and may be set depending on the results of experiments and the intention of a designer.

Further, the start signal denotes a signal applied when a key is turned to "ignition on (IG ON)" in the case of a key starting, and a signal applied when a driver presses a "start" button in the case of a button start scheme.

Furthermore, the oil pressure sensor may be, but is not limited to, an oil pressure sensor installed on a hydraulic cylinder used in an engine clutch of a hybrid vehicle.

The offset value denotes an output value output from the oil pressure sensor after the start signal is applied and refers to an error output value occurring due to the mechanical or design error of the oil pressure sensor itself. That is, since the time at which the detection step S120 is performed corresponds to a time before the oil pump is driven, the output value of the oil pressure sensor must be 0 V or a preset reference initial value which is a reference value when oil pressure is not present in the oil pressure line. However, when a value exceeding the output value of 0 V or the reference initial value is output, it is an error output value caused by the oil pressure sensor itself and may be designated as an offset value. Since the offset value varies differently whenever the vehicle starts, the detection step may be performed whenever the vehicle starts.

Figure 2:
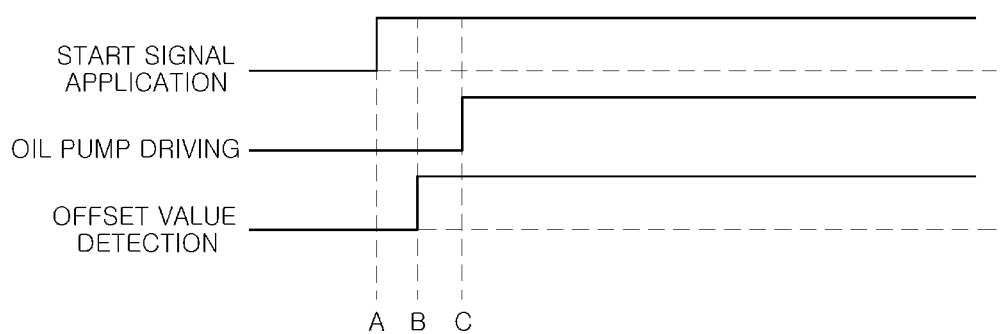
FIG. 2 is a timing diagram showing an offset correction method for an automobile oil pressure sensor according to an embodiment of the present disclosure.

FIG. 2 is a timing diagram showing an offset correction method for an automobile oil pressure sensor according to an embodiment of the present disclosure. A point at which a variation in a height of a line instantaneously occurs denotes a time at which the corresponding signal is applied. That is, when the start signal is applied at time A, and the oil pump is driven at time C, the detection step S120 is performed at time B. Therefore, in FIG. 2, the first preset period corresponds to a period ranging from time A to time C, and the second preset period corresponds to a period ranging from time A to time B.

At the detection step S120, after it is determined at the starting determination step S110 that the start signal is applied, that is, after "IG ON" is performed, and the second preset period has elapsed, the offset value is detected at step S120. The second preset period is the time required for the oil pressure sensor to be stabilized when power is supplied to the oil pressure sensor after the start signal is applied. The second preset period may not be longer than the first preset period. When the oil pressure sensor is stabilized, the output value of the oil pressure sensor also appears as a uniform value, and then an exact offset value of the oil pressure sensor may be detected at step S120.

Since the detection step S120 is performed within the first preset period, the offset value may be detected at step S120 before the oil pump is driven. Accordingly, the offset value of the oil pressure sensor itself can be detected at step S120 without being influenced by the leakage of oil in the oil pressure line caused by driving the oil pump, thus accurately detecting the oil pressure in the oil pressure line.

Meanwhile, after the detection step S120 is performed, the validity determination step S130 of determining whether or not the start signal has been applied after a third preset period has elapsed from the turning-off of the ignition of the vehicle may be further performed.

The validity determination step S130 is described in detail below. The validity determination step S130 determines whether or not residual oil pressure is detected in the oil pressure line at the time at which the detection step S120 is performed. If the start signal is applied after the third preset period has elapsed from the turning-off of the ignition of the vehicle, it may be determined that the offset value detected at the detection step S120 is not influenced by the residual oil pressure.

That is, the third preset period ranges from a time at which the ignition of the vehicle is turned off after the vehicle is driven to a time at which residual oil pressure present in the oil pressure line is eliminated. If the start signal is applied again within the third preset period ranging from the time at which the ignition is turned off after driving the vehicle immediately before the start signal is applied, the residual oil pressure present in the oil pressure line caused by driving the vehicle immediately before the start signal is applied is not yet eliminated. Accordingly, the oil pressure sensor outputs a value obtained by adding the offset value of the oil pressure sensor itself to an output value corresponding to the residual oil pressure, and this is not the offset value of the oil pressure sensor, and thus, an inaccurate offset value is output.

In order to prevent any residual oil pressure from remaining in the oil pressure line at the time at which the detection step S120 is performed, it is determined that the offset value detected at the detection step S120 is not influenced by the residual oil pressure when the start signal is applied after the third preset period has elapsed from the turning-off of the ignition.

Therefore, if the third preset period has elapsed at the validity determination step S130, a correction value for the offset value is generated and stored at step S141. If it is determined at the validity determination step S130 that the third preset period has not yet elapsed, a pre-stored correction value is used at step S142. Here, the pre-stored correction value denotes a correction value generated and stored when the vehicle is driven immediately before the start signal is applied.

The correction value is a value obtained by subtracting the reference initial value from the offset value. After the oil pump is driven at step S150 after the first preset period has elapsed, the oil pressure sensor detects oil pressure on the oil pressure line at step S160. The correction value is subtracted from all output values output from the oil pressure sensor, and thus, the correction of the output value of the oil pressure sensor and the correction of the detected oil pressure are performed at step S170.

For example, when the reference initial value is 0.1 V, and the offset value is 0.5 V, a value of 0.4 V becomes the correction value. When the first preset period elapses, and the oil pump is driven at step S150, correction is performed by subtracting 0.4V from all of the output values of the oil pressure sensor and calculating resulting values as oil pressure at step S170.

However, at the validity determination step S130, if the third preset period has not elapsed, the value detected at the detection step S120 is an inaccurate value differing from the offset value of the oil pressure sensor, and thus, the value detected at the detection step S120 is discarded, and correction is performed using the pre-stored correction value generated when the vehicle is previously driven at step S170.

The validity determination step S130 and the correction value generation and storage step S141 may be performed in a period ranging from the termination of the second preset period to a time at which the first preset period ends (a period ranging from time B to time C in FIG. 2). That is, the period after the detection step S120 is performed, and before the driving step S150 is performed. The reason for this is to generate the correction value at step S141 before the oil pump is driven at step S150, and thus to correct the output value of the oil pressure sensor for oil pressure presented in the oil pressure line at step S170 after the oil pump is driven.

The correction step S170 may be performed until the ignition of the vehicle is turned off by determining whether the ignition of the vehicle is turned off at step S180.

In accordance with the offset correction method for the automobile oil pressure sensor having the above configuration, only the offset of the oil pressure sensor itself can be detected, and thus, the accuracy of the oil pressure sensor can be improved. The accuracy of other control logics that use the oil pressure sensor can also be improved.

Furthermore, an engine clutch can be accurately controlled.

Although the exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. An offset correction method for an automobile oil pressure sensor, comprising steps of:
   determining whether or not an engine start signal is applied;
   detecting an offset value of the oil pressure sensor installed on an oil pressure line connected to an oil pump within a first preset period after the start signal is applied;
   performing a validity determination by determining whether or not the start signal is applied after a second preset period elapses since turning-off of vehicle ignition; and
   correcting an output value of the oil pressure sensor after the offset value is detected.

2. The offset correction method of claim 1, further comprising a step of driving the oil pump after the offset value is detected.

3. The offset correction method of claim 2, wherein the first preset period is a period spanning from a time at which the start signal is applied to a time at which the oil pump is driven.

4. The offset correction method of claim 1, wherein the step of detecting the offset value occurs after a third preset period has elapsed from the application of the start signal.

5. The offset correction method of claim 4, wherein the step of performing the validity determination includes generating a correction value for the offset value and storing the generated correction value, if the second preset period has elapsed.

6. The offset correction method of claim 5, wherein the step of generating and storing the correction value is performed before the step of driving is performed.

* * * * *